US010458472B2

(12) United States Patent
Zaghi et al.

(10) Patent No.: US 10,458,472 B2
(45) Date of Patent: Oct. 29, 2019

(54) FORCE SENSING SLIDING BEARING

(71) Applicant: University of Connecticut, Farmington, CT (US)

(72) Inventors: Arash Esmaili Zaghi, Storrs, CT (US); Kevin McMullen, Naugatuck, CT (US); Michael V. Hoagland, Bloomfield, CT (US)

(73) Assignee: University of Connecticut, Farmington, CT (US)

( * ) Notice: Subject to any disclaimer, the term of this patent is extended or adjusted under 35 U.S.C. 154(b) by 13 days.

(21) Appl. No.: 15/590,096

(22) Filed: May 9, 2017

(65) Prior Publication Data

US 2017/0328407 A1 Nov. 16, 2017

Related U.S. Application Data

(60) Provisional application No. 62/333,986, filed on May 10, 2016.

(51) Int. Cl.
 *F16C 33/20* (2006.01)
 *F16C 29/02* (2006.01)
 (Continued)

(52) U.S. Cl.
 CPC ............ *F16C 33/201* (2013.01); *F16C 29/02* (2013.01); *F16C 33/205* (2013.01); *F16C 41/00* (2013.01);
 (Continued)

(58) Field of Classification Search
 CPC ........ F16C 33/20; F16C 41/00; F16C 33/201; F16C 11/045; F16C 17/24; F16C 2208/10; F16C 2233/00; F16C 2208/86; F16C 2370/00; F16C 2208/32; F16C 32/0611; F16C 32/0666; F16C 32/0662; G01G 19/02; E01D 19/04; E01D 21/00; G01L 1/162; G01M 5/0066; G01M 5/0033; H01L 41/1132; G01H 9/004; G01H 11/08; G01H 11/00; G01N 29/245; G01N 29/4463;
 (Continued)

(56) References Cited

U.S. PATENT DOCUMENTS 5,889,214 A * 3/1999 Kang ................. G01L 5/161
 73/862.043
7,729,035 B2 * 6/2010 Kim ................... G01H 9/004
 359/285

(Continued)

FOREIGN PATENT DOCUMENTS

CN 102168403 A 8/2011
CN 102564660 A 7/2012
(Continued)

*Primary Examiner* — Brandi N Hopkins
(74) *Attorney, Agent, or Firm* — McDonnell Boehnen Hulbert & Berghoff LLP

(57) ABSTRACT

In one aspect, the present disclosure provides a sliding bearing system, comprising (a) a base plate, (b) one or more force measuring sensors, wherein each of the one or more force measuring sensors includes a top surface and a bottom surface, and wherein the bottom surface of each of the one or more force measuring sensors is coupled to the base plate, and (c) a first sliding surface coupled to the top surface of each of the one or more force measuring sensors.

15 Claims, 8 Drawing Sheets

(51) Int. Cl.
*G01G 19/02* (2006.01)
*F16C 41/00* (2006.01)
*F16C 17/24* (2006.01)

(52) U.S. Cl.
CPC ........... *F16C 41/008* (2013.01); *G01G 19/02* (2013.01); *F16C 17/24* (2013.01); *F16C 2208/32* (2013.01); *F16C 2226/40* (2013.01); *F16C 2233/00* (2013.01); *F16C 2350/00* (2013.01)

(58) Field of Classification Search
CPC ..... G01N 2291/011; G01N 2291/0258; G01N 2291/0423; G01N 2291/106; G01N 29/043; G01N 29/2475; G01N 2291/015; G01N 2291/0422; G01N 2291/0427
See application file for complete search history.

(56) References Cited

U.S. PATENT DOCUMENTS

| | | | |
|---|---|---|---|
| 8,402,702 B1* | 3/2013 | Villaverde | E04H 9/022 14/73.5 |
| 8,869,633 B2* | 10/2014 | Biehl | F16C 19/52 73/862.473 |
| 2001/0030826 A1* | 10/2001 | Thia | G11B 5/59611 360/69 |
| 2005/0081638 A1* | 4/2005 | Couch | G01L 9/0042 73/716 |
| 2006/0081071 A1* | 4/2006 | Kessler | G01L 1/162 73/862.391 |
| 2007/0012111 A1* | 1/2007 | Kim | G01H 9/004 73/594 |
| 2010/0172605 A1* | 7/2010 | Pausch | F16C 33/416 384/446 |
| 2010/0195942 A1* | 8/2010 | Tavecchio | E01D 19/04 384/36 |
| 2013/0216174 A1* | 8/2013 | Braun | B29C 67/0051 384/572 |
| 2014/0096615 A1* | 4/2014 | Park et al. | G01L 1/14 73/26 |
| 2015/0323398 A1* | 11/2015 | Lauzier | B25J 9/0081 73/862.08 |

FOREIGN PATENT DOCUMENTS

| | | |
|---|---|---|
| DE | 4402608 A1 | 8/1995 |
| DE | 19913895 B4 | 3/1999 |
| DE | 102007052201 B3 | 2/2009 |
| DE | 102007014161 B4 | 6/2009 |
| EP | 0974820 B1 | 7/2005 |

* cited by examiner

FORCE SENSING SLIDING BEARING

CROSS-REFERENCE TO RELATED APPLICATIONS

This application claims the benefit of the filing date of U.S. Provisional Patent Application Ser. No. 62/333,986, filed May 10, 2016, which is hereby incorporated by reference in its entirety.

FIELD OF THE INVENTION

The disclosure contained herein is in the general field of technology for monitoring or measuring forces, in particular to measure vertical loads on bearings in a structure.

BACKGROUND

In 2015, the United States Federal Highway Administration (FHWA) requested $51.3 billion "to maintain and improve the safety, condition, and performance of our national highway system, and enable FHWA to provide effective stewardship and oversight of highway programs and funding" for the 2016 fiscal year (FHWA, 2015). This value is minimal compared to the estimated $76 billion needed to repair or replace the roughly 65,000 structurally deficient bridges in the country (ASCE, 2013). In addition to bridge repair, FHWA funds are needed for road maintenance, traffic monitoring and safety, inspections, new design, and new construction along with a long list of logistical costs. Due to financial constraints, there is a major push for new, innovative solutions to reduce design, construction, maintenance, repair, and logistical costs for infrastructure projects. Incorporating technological advances into current design practices is one avenue that is being explored and has promise to be extremely beneficial.

The development of "smart" bridge bearing technology has the potential to solve many problems that the FHWA, state Departments of Transportation (DOTs), and private bridge owners are facing. Bridge bearings are structural components that are designed to allow translation and rotation of a bridge. They support the superstructure of a bridge and transfer loads from the superstructure to the substructure. There are several types of bearings including, for example, rocker, spherical, elastomeric, sliding, and pot bearings.

Based on the current state of the art, bridge bearings are monitored by visual inspection. Bridge weigh-in-motion studies are conducted on a case by case basis where the bridge is instrumented and monitored for a given period of time. This process is expensive, time consuming, and still has several uncertainties when analyzing the results. Traffic statistics are usually collected manually or with traffic counters laid across roadways. Inspections and design validations are conducted by updating the as-built design with the existing conditions of the bridge and determining its response to design loads. Therefore, an improved and cost-efficient "smart" bridge bearing may be desirable.

SUMMARY OF THE INVENTION

Disclosed herein is a sliding bearing system with force sensing technology integrated into the design to measure vertical loads on the bearing. The sliding bearing system comprises a bearing combined with force sensors that can accurately and precisely measure loads that the bearing is supporting in a structure. The sliding bearing system also retains capacity to accommodate horizontal displacements/movements in the structure.

A primary advantage of the disclosed sliding bearing system is that it retains load-bearing capacity while including sensors. The disclosed sliding bearing system with force sensing technology is cheap, nonintrusive, and adaptable for use in a wide variety of situations and structures.

In certain preferred embodiments, the sliding bearing system described herein is used for bridge bearings to measure vertical loads and pressure distributions. In other preferred embodiments, the sliding bearing system described herein is embedded for use in buildings or in industrial facilities and other industrial structures. These various embodiments of the sliding bearing system enable monitoring and measurement of forces and of responses of bearings under in situ loading.

By way of non-limiting example, the sliding bearing system may be monitored under traffic loads for several applications including, but not limited to, bridge weigh-in-motion (monitoring a bridge's response to a certain truck traveling across it to determine truck weight and speed), design validation, bridge inspections and load ratings, and recording traffic statistics. In other embodiments multiple force-sensors are embedded in bearings supporting a structure to enable detection and capture of eccentric loading of bearings.

The sliding bearing system disclosed herein is relatively cheap compared to other methods for monitoring bearings in bridges and other structures. The disclosed technology is easy to implement, and provides invaluable data to the bridge owners that can be used for several various applications explained above. The disclosed technology will make the transportation network safer and more reliable for both users and owners. It will give owners, for example municipalities or other governmental entities, the ability to monitor the bridge and traffic traveling across it, so the number of overweight trucks that travel over the bridge may be regulated to prevent excessive damage to the bridge. By monitoring the bearings, the components of the structural system may be replaced more efficiently and prior to component failure to save on the cost of installing such replacements.

Thus, in a first aspect, the present disclosure provides a sliding bearing system, comprising (a) a base plate, (b) one or more force measuring sensors, wherein each of the one or more force measuring sensors includes a top surface and a bottom surface, and wherein the bottom surface of each of the one or more force measuring sensors is coupled to the base plate, and (c) a first sliding surface coupled to the top surface of each of the one or more force measuring sensors.

In a second aspect, the present disclosure provides a method of vertical force measurement on bearings of construction, the method comprising (a) providing the sliding bearing system of the first aspect to a structural component, (b) receiving a vertical force on the sliding bearing system, (c) measuring the vertical force by the one or more force measuring sensors, (d) communicating the vertical force measurement data from the one or more force measuring sensors to a data transmission unit, and (e) transmitting the force measurement data to a processor configured to receive such data from the data transmission unit.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Figure 1:
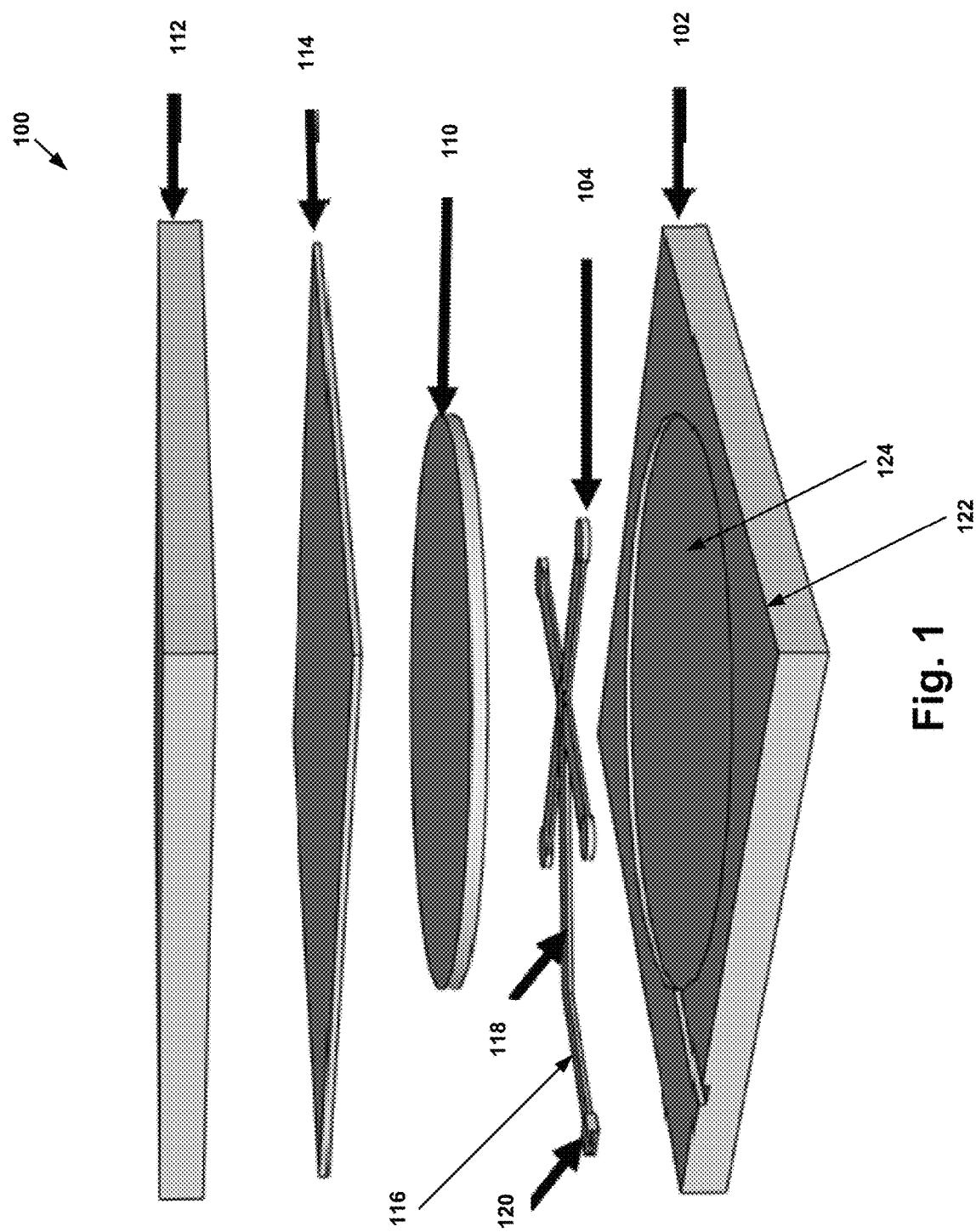
FIG. 1 is an exploded view of a sliding bearing system, according to an example embodiment.
Figure 2:
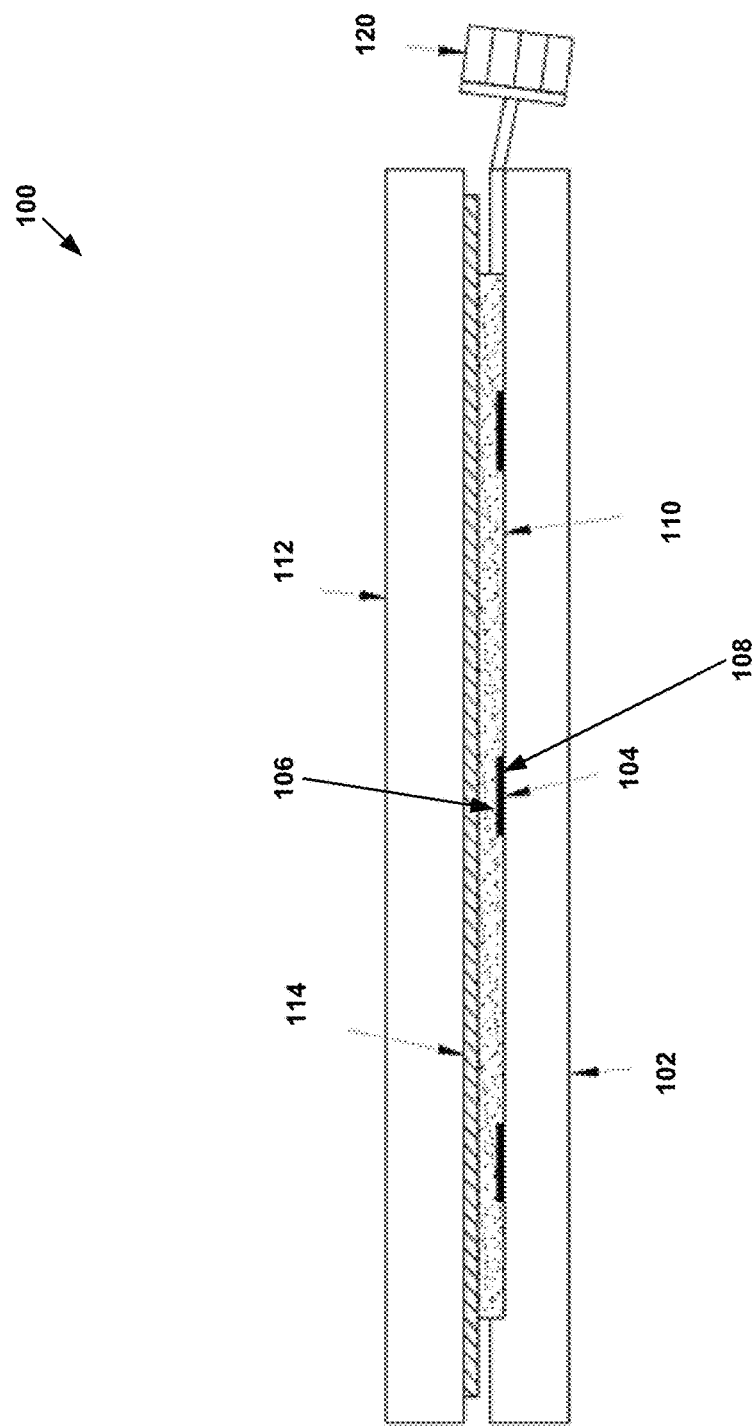
FIG. 2 is a side view of a sliding bearing system, according to an example embodiment.

With reference to the Figures, FIG. 1 illustrates an exploded view of a sliding bearing system 100, according to an example embodiment. As shown in FIG. 1, the sliding bearing system 100 includes a base plate 102. The base plate 102 may comprise steel or aluminum, as examples. The sliding bearing system 100 also includes one or more force measuring sensors 104. As shown in FIG. 2, each of the one or more force measuring sensors 104 includes a top surface 106 and a bottom surface 108. The bottom surface 108 of each of the one or more force measuring sensors 104 is coupled to the base plate 102. The sliding bearing system 100 also includes a first sliding surface 110 coupled to the top surface 106 of each of the one or more force measuring sensors 104. The bottom surface 108 of each of the one or more force measuring sensors 104 may be permanently coupled to the base plate 102 using epoxy, or through some other means. Similarly, the top surface 106 of each of the one or more force measuring sensors 104 may be permanently coupled to the first sliding surface 110 using epoxy, or through some other means.

As shown in FIG. 1, the sliding bearing system 100 may also include a top plate 112, and a second sliding surface 114 coupled to the top plate 112. In such an example, the second sliding surface 114 is positioned adjacent the first sliding surface 110 such that the first sliding surface 110 can move laterally and rotationally with respect to the second sliding surface 112. The first sliding surface 110 and the second sliding surface 112 may comprise a non-rigid material such as elastomeric pads or polytetrafluoroethylene (PTFE), as examples. Such non-rigid materials allow both rotation and translation as the material can compress and stretch. Further, the non-rigid material of the first sliding surface 110 and second sliding surface 114 enables the material to flow under loading to distribute the forces over the base plate 102 and the one or more force measuring sensors 104. Since the material has the capacity to flow, any load on the bearings is applied uniformly to the one or more force measuring sensors 104. Further, the first sliding surface 110 and second sliding surface 114 should have a low coefficient of friction to accommodate horizontal movements.

In one example, the first sliding surface 110 comprises the same material as the second sliding surface 114. In another example, the first sliding surface 110 comprises a different material than the second sliding surface 114. In such an example, the two materials may be selected to reduce friction between the two sliding surfaces 110, 114. The base plate 102 may comprise a first material and the first sliding surface 110 may comprise a second material that is different than the first material. In one particular example, the base plate 102 comprises steel and the first sliding surface comprises PTFE.

As shown in FIG. 1, the sliding bearing system 100 may also include a data transmission unit 116 connected to the one or more force measuring sensors 104. In such an example, the sliding bearing system 110 may also include a processor configured to receive data from the data transmission unit 116, as discussed in additional detail below. In one particular example, the data transmission unit 116 comprises a conducting wire 118 coupled to each of the one or more force measuring sensors 104, and an external plug 120 coupled to the conducting wire 118. As shown in FIG. 1, the external plug 120 is positioned outside of a perimeter of the base plate 102 to enable a user to easily access the external plug 120.

In one example, the sliding bearing system 110 is coupled to one or more of an elastomeric bearing, a pot bearing, a disk bearing, a spherical bearing, or a pinned bearing to accommodate rotational movements and to reduce uneven pressure on sliding surfaces. As shown in FIG. 1, the top surface 122 of the base plate 102 may include a cutout 124. In such an example, the one or more force measuring sensors 104 are positioned in the cutout 124.

Figure 3:
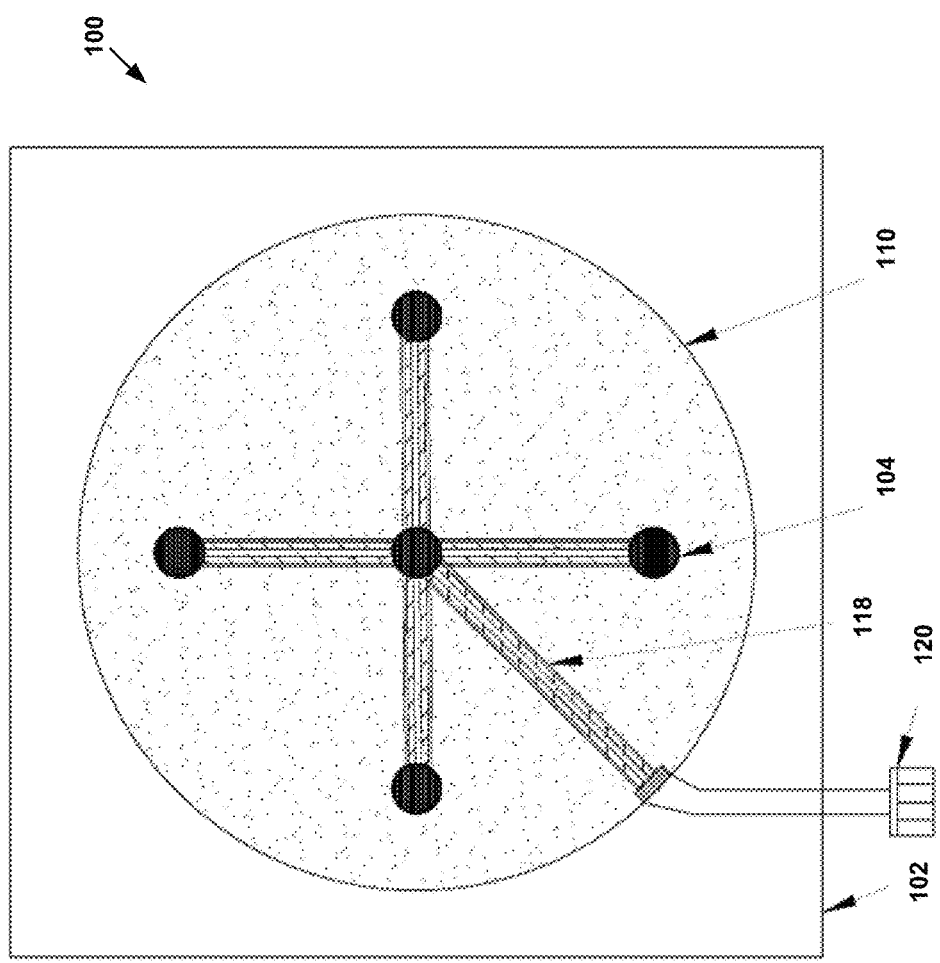
FIG. 3 is a top view of a sliding bearing system with the second sliding surface and top plate removed, according to an example embodiment.

In the example shown in FIGS. 1-3, the one or more force measuring sensors 104 comprise force sensing resistors. Force sensing resistors (FSRs) sensors are designed to detect physical pressures and applied loads. FSR sensors are small, thin, simple to use, and relatively cheap. FSR is made up of two layers of semi-conductors with a spacer separating them.

FSRs are essentially a resistor that can change resistance depending on applied force. With no load applied, the FSR has a resistance in the order of mega-ohms. The resistance of the FRS decreases exponentially with applied force to an order of approximately ten kilo-ohms. Typical FRS sensors have a slightly curve-linear relationship between conductance and applied force. Conductance is the inverse of the sensors resistance. The sensors may be calibrated to determine applied force based on the sensors conductance.

A force-to-voltage circuit may be included to output a voltage reading based on the sensors resistance. A voltage output of zero corresponds to no load on the sensors and the circuit has a maximum voltage output of 5V. This allows the sensor to be measured using only a volt meter. The relationship between force and voltage with this circuit has the same shape as conductance versus force.

Figure 4:
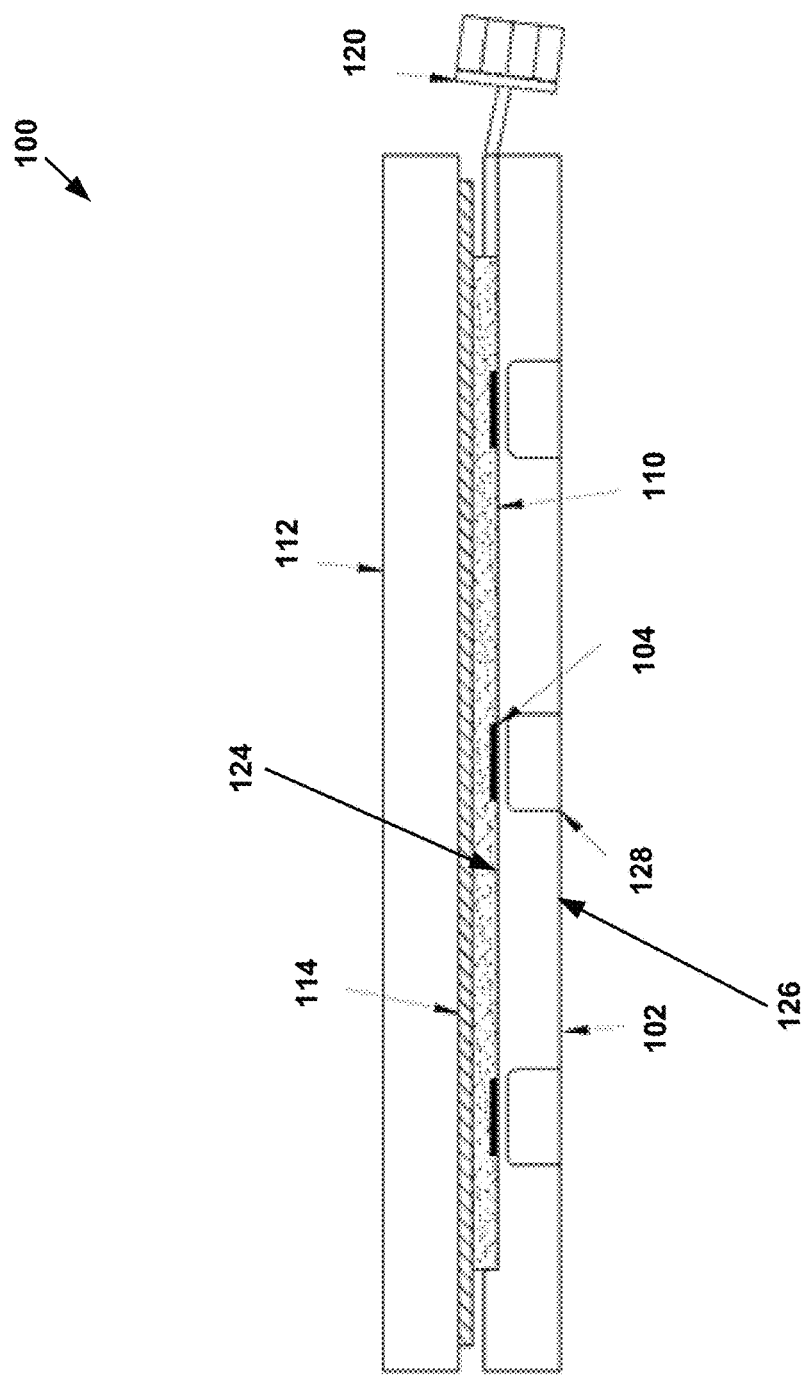
FIG. 4 is a side view of a sliding bearing system, according to an example embodiment.
Figure 5:
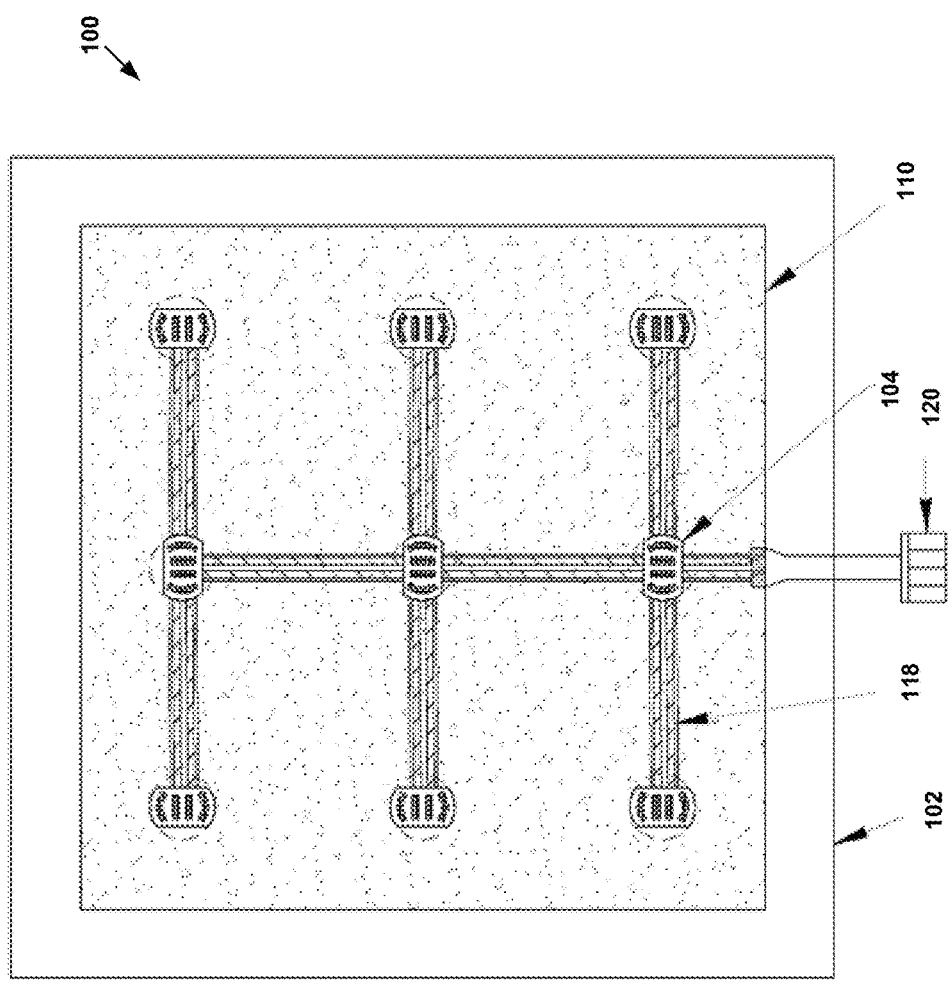
FIG. 5 is a top view of a sliding bearing system with the second sliding surface and top plate removed, according to an example embodiment.

In the examples shown in FIGS. 4-5, the one or more force measuring sensors 104 comprise strain gauge pressure transducers. Transducer-class strain gauges are a group of gauge patterns that are used for transducer applications. One type of transducer-class strain gauges is a diaphragm pressure transducer. This type of gauge is designed to capture the strain distribution of a diaphragm under uniform pressure. The diaphragm pressure transducer strain gauges that are used have either a circular pattern or a linear pattern.

These gauges are full bridge strain gauges with two tangential resistors in the center to capture tangential strain and two radial resistors on the outer edge to capture radial strain. The output is an average of the strain over the entire sensing area.

The thickness of the diaphragm can be designed to control the range of strain values depending on the material of the diaphragm and pressure applied. The diaphragm can be machined into a bearing plate to a specified thickness. The diameter of the diaphragm is dependent on the strain gauge that is used and its sensing area. Full bridge strain gauges have very good linearity between force and strain with minimal drift and hysteresis and are typically used for structural engineering applications.

In particular, as shown in FIG. 4, a bottom surface 126 of the base plate 102 includes one or more diaphragms 128, and each of the one or more strain gauge pressure transducers 104 are coupled to the top surface 122 of the base plate 102 such that a given strain gauge pressure transducer of the one or more strain gauge pressure transducers 104 is positioned over a given diaphragm of the one or more diaphragms 128. The strain gauges measure the strain in the base plate as the diaphragm bends under load. Gauges may be calibrated to find the total pressure and the pressure distribution on the structural bearing.

In preferred embodiments the sliding bearing system 100 is installed in a bridge in a manner that can be integrated and functional in a full bridge system. In some embodiments, the sliding bearing system 100 may be equipped with an uplift restraint mechanism and/or restrainers to limit or prevent the sliding movements in some directions.

A primary object of the sliding bearing system 100 disclosed herein is to enable the measurement of the magnitude and distribution of bearing pressure perpendicular to sliding surfaces in bearings in a structure, as well as to enable the measurement of total bearing forces. The disclosed sliding bearing system 100 can also measure pressure distributions across the surface of a bearing pad to capture eccentric loading.

The disclosed sliding bearing system 100 can function as a very low profile load cell and as a sliding bearing in a single assembly. Since it is so thin, it can be used in several applications where depth is restricted to measure vertical forces. There are not many thin load cells in the market and the ones that do exist, are very expensive and difficult to manufacture.

Figure 6:
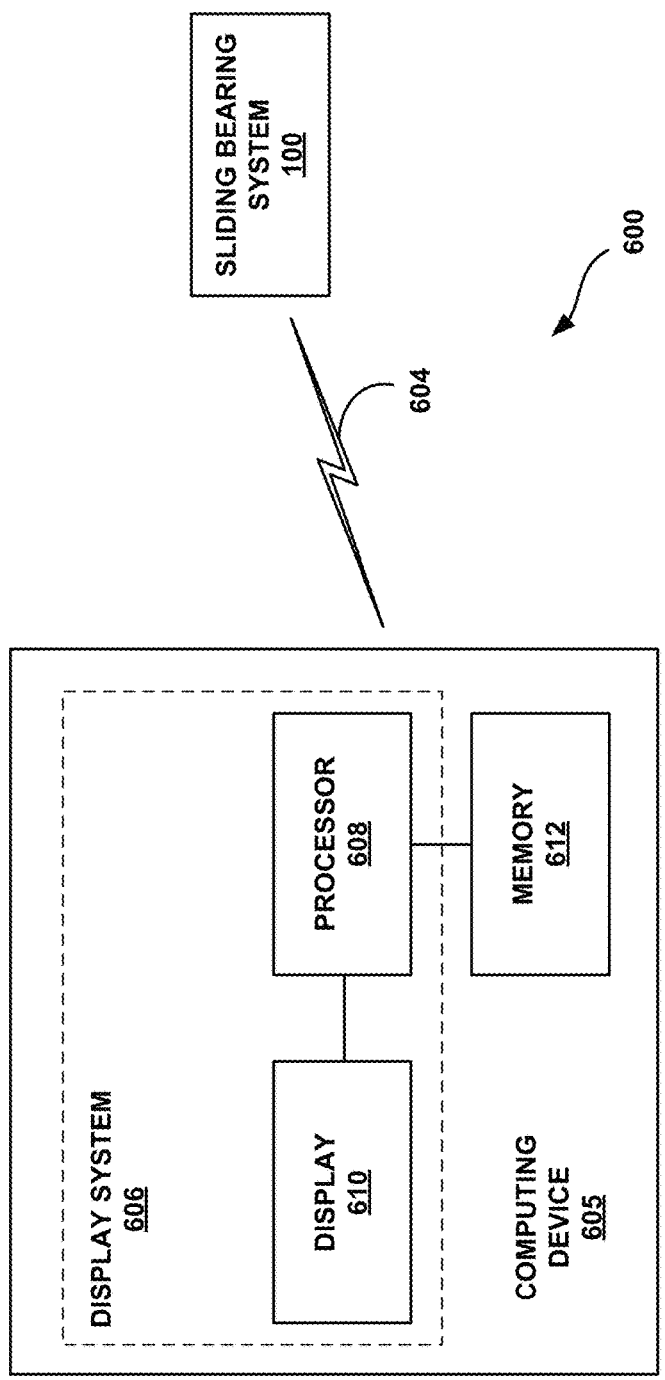
FIG. 6 is a schematic drawing of a computer network infrastructure, according to an example embodiment.

FIG. 6 illustrates an example schematic drawing of a computer network infrastructure. In one system 600, a computing device 602 communicates with the sliding bearing system 100 using a communication link 604, such as a wired or wireless connection. In particular, the computing device 602 may communicate with the data transmission unit 116 of the sliding bearing assembly 100. The computing device 602 may be any type of device that can receive data and display information corresponding to or associated with the data. For example, the computing device 602 may be a mobile phone, a tablet, or a personal computer as examples.

Thus, the computing device 602 may include a display system 606 comprising a processor 608 and a display 610. The display 610 may be, for example, an optical see-through display, an optical see-around display, or a video see-through display. The processor 608 may receive data from the sliding bearing system 100, and configure the data for display on the display 610. Depending on the desired configuration, processor 608 can be any type of processor including, but not limited to, a microprocessor, a microcontroller, a digital signal processor, or any combination thereof.

The computing device 602 may further include on-board data storage, such as memory 612 coupled to the processor 608. The memory 612 may store software that can be accessed and executed by the processor 608, for example. The memory 612 can include any type of memory now known or later developed including but not limited to volatile memory (such as RAM), non-volatile memory (such as ROM, flash memory, etc.) or any combination thereof.

According to an example embodiment, the computing device 602 may include program instructions that are stored in the memory 612 (and/or possibly in another data-storage medium) and executable by the processor 608 to facilitate the various functions described herein. Although various components of the system 600 are shown as distributed components, it should be understood that any of such components may be physically integrated and/or distributed according to the desired configuration of the computing system.

The sliding bearing system 100 and/or the computing device 600 may contain hardware to enable the communication link 604, such as processors, transmitters, receivers, antennas, etc.

In FIG. 6, the communication link 604 is illustrated as a wireless connection; however, wired connections may also be used. For example, the communication link 604 may be a wired link via a the external plug 120 of the sliding bearing system 100. The external plug 120 may comprise a serial bus such as a universal serial bus or a parallel bus, as examples. A wired connection may be a proprietary connection as well. The communication link 604 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In certain embodiments, such as shown in any one of FIGS. 1-5, example sliding bearing systems 100 may be made using an additive-manufacturing process, such as stereolithography. As such, the example sliding bearing systems 100 described above may include a variety of materials, as described above. In one example, the additive-manufacturing process is a multi-material additive-manufacturing process such that various components of the sliding bearing system 100 may be formed using different materials. For example, the base plate 102 may be created with a material having greater rigidity (e.g., steel or aluminum) than the sliding surfaces 110, 114 (e.g., PTFE). Other examples are possible as well.

Each of the filtration devices described in FIGS. 1-5 may represent a module, a segment, or a portion of program code, which includes one or more instructions executable by a processor or computing device for creating such devices using an additive-manufacturing system. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Figure 7:
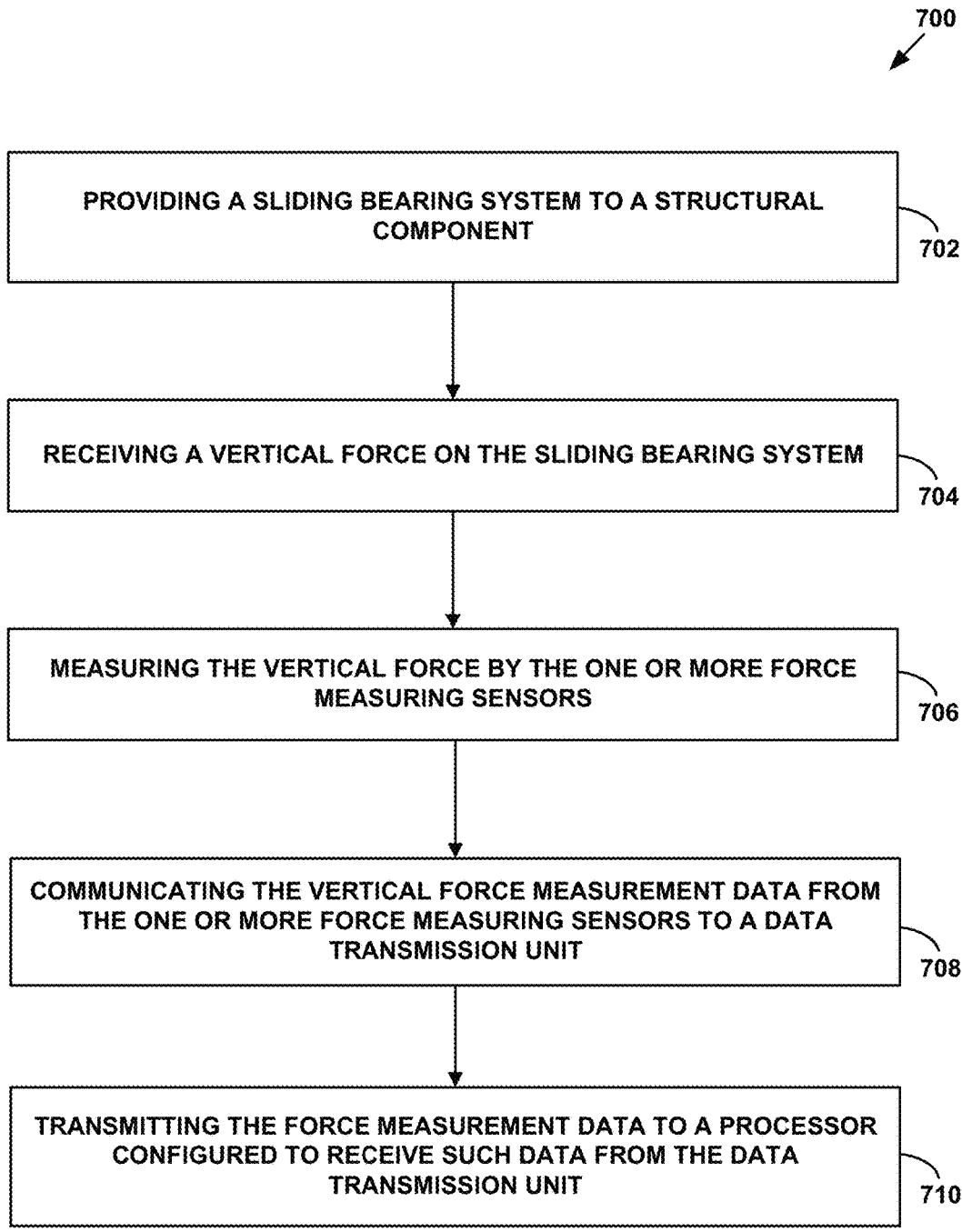
FIG. 7 is a flowchart illustrating an example method according to an example embodiment.

FIG. 7 is a block diagram of vertical force measurement on bearings of construction. Method 700 shown in FIG. 7 presents an embodiment of a method that could be used by the sliding bearing system 100 of FIGS. 1-6, as an example. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Initially, at block 702, the method 700 includes providing the sliding bearing system to a structural component. The structural component may be a beam in a bridge, as an example. At block 704, the method 700 includes receiving a vertical force on the force sensing sliding bearing system. At block 706, the method 700 includes measuring the vertical force by the one or more force measuring sensors. As discussed above, the one or more force measuring sensors may comprise force resisting sensors or strain gauge pressure transducers. At block 708, the method 700 includes communicating the vertical force measurement data from the one or more force measuring sensors to a data transmission unit. Such a communication may be wired or wireless, as discussed above in relation to FIG. 6. At block 710, the method 700 includes transmitting the force measurement data to a processor configured to receive such data from the data transmission unit.

Figure 8:
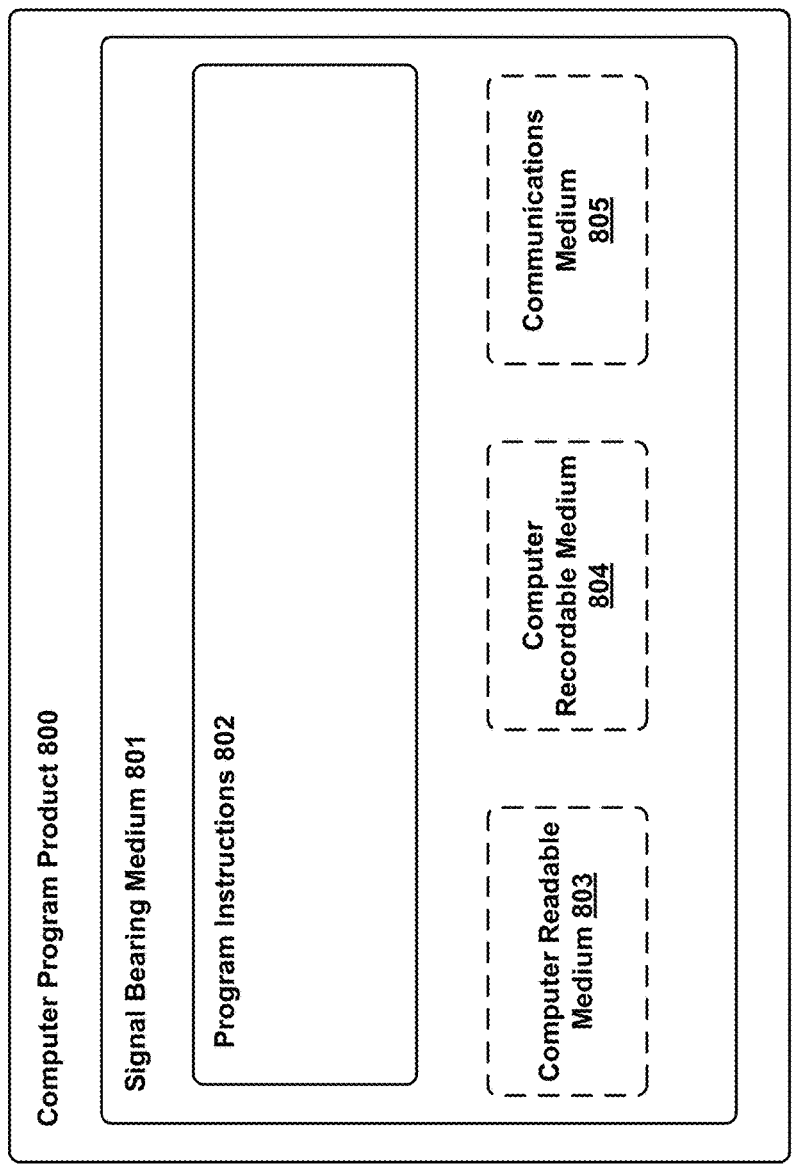
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more program instructions 802 may be, for example, computer executable and/or logic implemented instructions. In some examples, a computing device such as the computing device 600 of FIG. 6 may be configured to provide various operations, functions, or actions in response to the program instructions 802 conveyed to the computing device 800 by one or more of the computer readable medium 803, the computer recordable medium 804, and/or the communications medium 805.

EXAMPLES

Small Scale Test Samples

PTFE:PTFE with Force Sensing Resistors

Example 1

A sample was manufactured with two ⅛" 15% glass PTFE sheets. The sheets were cut into exactly 3"×3" squares. Four Flexiforce A201 sensors were placed over the epoxy ¾" from each edge at the corners of the samples. The Flexiforce A201 sensors used had a circular sensing diameter of 0.375" and a sensing area of 0.11 in$^2$. The total wire length of the sensor was 7.5". The sensors had a maximum capacity of 100 lbs, but loads of 1,000 lbs could be measured by apply a low drive voltage to the sensor. Both PTFE sheets were chemically etched on one side so that they could adhere to the epoxy. Armstrong A-12 epoxy was used with a 1:1 mix ratio of the hardener and the resin. The sample was allowed to cure for five days under a pressure of approximately 70 lbs.

Example 2

A sample was made with two ⅛" 15% glass PTFE sheets cut into 3"×3" squares. This sample only had one Flexiforce A401 sensors at the center of the sample. The Flexiforce A401 sensor has a sensing diameter of 1 in and a sensing area of 3.14 in$^2$. The sensor has a load capacity of 25 lbs, but loads of 7,000 lbs may be achieved by apply a voltage-to-force circuit. Prior to epoxying, the sensor was glued to the PTFE using Duro Super Glue. Both sheets were chemically etched on one side and a 1:1 ratio of Armstrong A-12 Epoxy was used to bond them. The sample was allowed to cure for five days under a pressure of approximately 70 lbs. This sample utilized the A401 sensor to test the response on a larger sensing area.

Example 3

A sample was made with two ¼" 15% glass PTFE sheets cut into 3"×3" squares. This sample had four Flexiforce 100 lb A201 sensors spaced ¾" from each edge at the corners of the sample. The PTFE and the sensors were first compressed without adhesive at a pressure of 2,200 psi in a Satec 400 kip Load Frame for 5 minutes. This pre-compression was done to condition the sensors and allow the PTFE to mold around the sensor. A Duro superglue was used to bond the two chemically etched sides of the PTFE sheets and the sensors. The Duro superglue is fast setting so the sample was quickly glued and then compressed under a pressure of 2,200 psi for 5 minutes. The sample tested pre-compression methods of the PTFE, a thicker ¼" PTFE sheet, and the use of a superglue adhesive.

Steel:PTFE with Force Sensing Resistors

Example 4

A sample was manufactured with a ¹⁄₁₆" thick steel sheet and a ⅛" thick 15% glass PTFE sheet cut into 3"×3" squares. The bond surface of the steel plate was sanded with coarse sand paper and cleaned with acetone. Four 100 lb A201 Flexiforce sensors were used and spaced ¾" from each edge at all four corners. The sensors were fixed to this position on the steel plate using Duro Super Glue. Armstrong A-12 Epoxy was used to adhere the PTFE sheet to the steel plate. The epoxy was allowed to cure for five days under approximately 70 lbs. This sample was similar to the sample prepared in Example 1 except it used a steel bottom plate rather than PTFE.

Example 5

A sample was manufactured with a ¹⁄₁₆" thick steel sheet and a ¼" 15% glass PTFE sheet cut in 3"×3" squares. The steel plate was sanded and cleaned before manufacturing. Four 100 lb A201 sensors were used and spaced 1" from each edge at all four corners. The tail of each sensor was lightly glued down with Duro Super Glue to fix its position. The steel, sensor, and PTFE were then pre-compressed under a pressure of 2,200 psi for 20 minutes. This was done to condition and mold the sensors into a recess in the PTFE. Duro Super Glue and Loctite Gel Super Glue were used to bond the steel to the PTFE. The sample was quickly placed under 2,200 psi for 10 minutes for the super glue to set. This sample was similar to the sample prepared in Example 3 except that it had a steel bottom plate rather than a PTFE sheet.

Example 6

A sample was made with a ¼" Virgin PTFE sheet and a ¹⁄₁₆" thick steel sheet cut into 3"×3" squares. The surface of the steel plate was sanded and cleaned to ensure a perfect bond. Four 100 lb A201 Flexiforce Sensors were used for this sample and were spaced 1" from the edges of each corner. The location of each of the sensors was fixed by applying a drop of Loctite Gel Super Glue to the tail of the sensor. Prior to gluing, the sample was then pre-compressed at a pressure of 2,200 psi for 10 minutes to condition the sensors and to recess the sensors into the PTFE. Loctite Gel Super Glue was used to bond the PTFE to the steel plate. After gluing, the sample was quickly placed under a pressure of 2,200 psi for 30 minutes. The sample was similar to the sample prepared in Example 5 except virgin PTFE was used instead of glass filled.

Example 7

A sample was made of a ¹⁄₁₆" thick steel sheet and a ⅛" virgin PTFE sheet cut into 3"×3" squares. The surface of the steel plate was sanded and cleaned before manufacturing. This sample used one 100 lb A201 Flexiforce Sensor placed at the center of the plate. The sensor was protected by ultrathin PTFE sheets and tapped to the steel to ensure that no adhesive was between the sensor and the steel or PTFE sheets. The sample was then pre-compressed in an Instron 20 kip Load Frame at a pressure of 2,200 psi for 15 minutes so that the entire housing for the sensor was recessed into the PTFE before gluing. Loctite Gel Super Glue was used to bond the steel sheet to the PTFE sheet. The sample was quickly placed under a pressure of 550 psi after gluing. The sample was then placed in a hot press and compressed under 550 psi for 30 minutes at 140° F. to allow the PTFE to mold itself around the sensor. This sample tested the idea of removing all mechanical bonds between the sensing area and the sample.

Example 8

A sample was made of ¹⁄₁₆" thick steel sheet and a ¹⁄₁₆" virgin PTFE sheet cut into 3"×3" squares. The surface of the steel plate was sanded and cleaned before manufacturing. One 100 lb A201 Flexiforce sensor placed at the center of the plate was used for this sample. The sensor was protected by ultrathin PTFE sheets that were tapped down to the steel to ensure that no adhesive was between the sensor and the steel or PTFE. The sample was pre-compressed to a pressure of 2,200 psi for 5 minutes to condition the sensors and form a recess in the PTFE for the sensor and the protective housing. Loctite Gel Super Glue was used to bond the steel to the PTFE sheet. The sample was quickly placed under a pressure of 550 psi after gluing. The sample was then placed in a hot press and compressed under 550 psi for 30 minutes at 140° F. to allow the PTFE to mold itself around the sensor. This sample was similar to the sample prepared in Example 7 except it used ¹⁄₁₆" PTFE instead of ⅛" to note the effects of PTFE thickness.

Example 9

A sample was made of a ¹⁄₁₆" thick steel sheet and a ⅛" virgin PTFE sheet cut into 3"×3" squares. The surface of the steel plate was sanded and cleaned before manufacturing. One 100 lb A201 Flexiforce sensor placed at the center of the plate was used for this sample. The sensor was first conditioned and calibrated to 1,100 lbs before being manufactured into the sample as prescribed by Tekscan (2015). The sensor was then fixed at the center of the plate by applying a small drop of glue to the tail of the sensor.

Armstrong A-12 Epoxy was used to adhere the steel sheet to the PTFE sheet. The sample was placed in a hot press and compressed under 800 psi at 140° F. for 2 hours to allow the epoxy to cure. This sample tested several different manufacturing steps including pre-conditioning of individual gauges and elevated temperature curing.

Steel:Steel:PTFE with Force Sensing Resistors

Example 10

This sample was comprised of two layers. The first layer was two 1/16" steel sheets. The sheets were sanded and cleaned before manufacturing. The top of the sample was a 1/8" 15% glass PTFE sheet. Eight 100 lb A201 Flexiforce Sensors were used. Four sensors were placed between the steel to steel layer and four sensors were placed in the top layer of steel between the PTFE sheet. Both sets of sensors were placed 3/4" from the edge at each corner. The location of the sensors on the PTFE sheet was recessed to a depth of 0.008" (thickness of the sensor). This was done to ensure that the sensor did not add any additional thickness to the sample. Armstrong A-12 Epoxy was used to bond the layers of the sample together. The three layers were centered on a steel plate on top of four 73086 Century Springs with a spring constant of 315 lbs/in. The springs were compressed 0.317" using a hydraulic jack to apply a uniform pressure of 50 psi. The epoxy was placed in the press for 5 days to cure. The manufacturing of this sample was done to check the sensors response between two layers of steel and how it varies with sensors between a layer of steel and a layer of PTFE.

Precision Steel:PTFE with Force Sensing Resistors

Example 11

This sample used a 1/8" alloy steel, hardened tight-tolerance precision sheet and a 3/16" 15% glass PTFE sheet cut in 3"×3" squares. The precision steel plate was sanded and cleaned before manufacturing. Four 100 lb A201 Flexiforce sensors were used at the corners of the plate spaced 0.875" from the central x-axis and y-axis. The location of each of the sensors was fixed with a very thin strip of mylar tape across the tail of the sensor. The sensors were conditioned between two steel plates before the sample was epoxied. Armstrong A-12 Epoxy was used to bond the steel to the PTFE. A small 4"×4" manufacturing device was used to compress the sample. It consisted of a top plate and a bottom plate and four springs with a spring constant of 500 lbs/in that were used to apply load to the sample. The springs were placed around threaded bars, so that a nut could be used to compress the springs. The springs were compressed ~0.2" for a total applied pressure of 50 psi on the surface of the sample. The sample was allowed to cure under pressure for 5 days. This sample used precision steel instead of a normal steel sheet to determine whether surface flatness was a critical factor.

Example 12

This sample used a 3/32" precision steel plate and a 3/16" 15% glass PTFE sheet cut into 3"×3" squares. The steel plate was sanded and cleaned before the sensors were applied. Four 100 lb A201 Flexiforce Sensors were used. The Flexiforce sensors were cut to a length of approximately 1.5" and the end of the tail was peeled back to expose the semi-conducting layers. The sensors were placed in each corner of the sample 0.875" from the central x and y axes. The tails of the sensors were directed towards the center of the plate. Six layers of mylar tap were placed around the sensors to ensure that the sensing area was the highest internal point the PTFE would rest on. A seventh piece of tape was used to fix the position of the sensors. Uncoated AWG (American Wire Gauge) 36 wire was used to wire the sensors in parallel. A terminal pad was placed in the center of the sample. Each of the sensors has an input and an output semi-conducting lead. A wire was placed between each of the leads and the input wires from each of the sensors were wired to one side of the terminal pad and the output wires were directed to the opposite side. The wires were soldered to the terminal pad. Extra care was taken to avoid contacting the steel surface or crossing loose wires. One wire from each side of the terminal pad was then connected to a 6.5" length of an A201 sensor tail to exit the sample. Armstrong A-12 Epoxy was used to bond the sample together. The sample was stacked into the 4"×4" spring manufacturing device along with Flexiforce samples of Examples 13 and 14. The Instron 20 kip load frame applied a pressure of 50 psi to a top plate so the load was equally distributed to each of the springs. Four nuts were then tightened to the plate to maintain a constant load. The sample was set aside to cure for five days. This sample tested the ability to internally wire Flexiforce sensors in the PTFE and steel assembly.

Example 13

This sample used a 3/32" precision steel plate and a 3/16" 15% glass PTFE sheet cut into 3"×3" squares. The steel plate was sanded and cleaned before the sensors were applied. Four 1 lb ESS301 Flexiforce sensors were used. These sensors can achieve higher force ranges if a low voltage drive circuit is incorporated. These sensors have a 0.375" sensing diameter, a 0.11 in$^2$ sensing area, and a length of 1". The leads of the Flexiforce sensors were cut off. The sensors were placed in each corner of the sample 0.875" from the central x and y axis. The tails of the sensors were directed towards the center of the plate. Six layers of mylar tap were placed around the sensors to ensure that the sensing area was the highest internal point the PTFE would rest on. A seventh piece of tape was used to fix the sensors to the steel plate. Uncoated AWG (American Wire Gauge) 36 wire was used to wire the sensors in parallel. A terminal pad was placed in the center of the sample and surrounded by mylar tape to ensure the uncoated wire did not touch the steel plate. Each of the sensors have an input and output metal lead. A wire was soldered to the leads on each of the four sensors. The input leads were soldered to one side of the terminal pad and the output leads were soldered to the opposite side. Extra care was taken to avoid contacting the steel surface or crossing loose wires. One wire from each side of the terminal pad was then soldered to a 6" copper ribbon cable. Armstrong A-12 Epoxy was used to bond the sample together. The sample was stacked into the 4"×4" spring manufacturing device along with Flexiforce samples of Examples 12 and 14. The Instron 20 kip load frame was used to apply a pressure of 50 psi to a top plate so the load was equally distributed to each of the springs. Four nuts were then tightened to the plate to hold the load constant. The sample was set aside to cure for five days. This sample tested the ability to internally wire Flexiforce sensors with metal end leads in a PTFE-steel pad assembly.

Example 14

This sample used a 3/32" precision steel plate and a 3/16" 15% glass PTFE sheet cut into 3"×3" squares. The precision steel plate was sanded and cleaned before manufacturing. Four 100 lb HT201 Flexiforce sensors were used at the corners of the plate spaced 0.875" from the central x-axis and y-axis. The HT201 Flexiforce sensors have the same dimensions as the A201 sensors. Six layers of mylar tap were placed around the sensors to ensure that the sensing area was the highest internal point that the PTFE would rest on. The sensors were fixed to the steel plate with a seventh piece of tape. Armstrong A-12 Epoxy was used to bond the sample together. The sample was stacked into the 4"×4" spring manufacturing device along with Flexiforce samples of Examples 12 and 13. The Instron 20 kip load frame applied a pressure of 50 psi to a top plate so the load was equally distributed to each of the springs. Four nuts were tightened to the plate to ensure a constant load. The sample was set aside to cure for five days. This sample tested performance of the HT201 Flexiforce sensors.

Precision Steel:PTFE with Strain Gauge Diaphragm Pressure Transducers

Example 15

This strain gauge sample used a ⅛" precision steel plate and a ⅛" virgin PTFE sheet cut into 3"×3" squares. The precision steel plate was sanded and cleaned before manufacturing. One SGT-7/350-LD11 Omega Precision Strain Gauge was used. The strain gauge had a gauge factor of 2.12 and required a 0.28" diameter diaphragm. The thickness calculated to achieve optimal strain values was 0.04". The diaphragm diameter and thickness were machined using a CNC milling machine in the center of the plate. These dimensions were machined very accurately with the highest allowable tolerance. The surface directly over the diaphragm was thoroughly sanded and cleaned to ensure a perfect bond between the strain gauge and the steel. The strain gauge was glued directly in the center of the diaphragm using Loctite 401 super glue. The strain gauge used for this sample had pre-attached uncoated wire leads. Mylar tape was placed on the sides of the strain gauge to ensure there were no electrical shorts. There were three wire leads on each side of the strain gauge. One of the leads was connected to an excitation pad and two were connected to measurement pads. The full bridge circuit had to be closed outside the sample. All six leads were then soldered to a terminal pad inside the sample because the wire leads were not long enough to exit the sample. All six individual wires, approximately 4" long, were then soldered to each of the terminal pads and brought outside the sample. Armstrong A-12 Epoxy was used to bond the sample together. The sample was placed in a hot press under 250 psi at 200° F. for two hours to let the epoxy cure.

Example 16

This strain gauge sample used a ⅛" precision steel plate and a 3/16" 15% glass PTFE sheet cut into 3"×3" squares. The precision steel plate was sanded and cleaned before manufacturing. Four EA-06-S050P-35 Vishay Circular Transducer-Class Strain Gauges were used. The strain gauge had a gauge factor of 2.05 and required a minimum diaphragm diameter of 0.41". The thickness that was calculated to achieve optimal strain values was 0.0575". The gauges were placed at the corners of the plate 0.75" from the central x and y axes. The diaphragm diameter and thickness were machined using a CNC milling machine in the center of the plate. These dimensions were machined very accurately with the highest allowable tolerance. The surface directly over the diaphragm was thoroughly sanded with a die grinder with a 150 grit attachment and cleaned to ensure a perfect bond between the strain gauge and the steel. The strain gauges were glued directly in the center of the diaphragm using Loctite 401 super glue. The strain gauge had six soldering pads on the outer edge of the sensing area, three on each side. The full bridge circuit had to be closed. For the circular gauges, this was done inside the sample by connecting pad 1 to pad 2 and pad 4 to pad 5. AWG 36 PTFE coated wire was used for the internal wiring of the strain gauges. The wires were soldered to the strain gauge pad and to a Digi-key flat ribbon cable that was brought out of the sample. Each of the strain gauges were connected to their own ribbon cable with two excitation lead wires and two measurement lead wires. Armstrong A-12 Epoxy was used to bond the sample together. The sample was placed in the 4"×4" spring manufacturing device and a pressure of 50 psi was applied. The sample was held under load for 5 days to cure.

Recessed Steel Plate and PTFE with Strain Gauge Diaphragm Pressure Transducers

Example 17

This strain gauge sample used a 4"×4"×½" steel plate and a 3"×3"×⅛" virgin PTFE sheet. The steel plate was recessed 3.05"×3.05"×1/16" in the center for the PTFE pad. The steel plate was sanded and cleaned before manufacturing. One SGT-7/350-LD11 and four SGT-9/350-LD41 Omega Precision Strain Gauge were used. The 7/350 strain gauge had a gauge factor of 2.12, a 0.28" required diameter diaphragm, and a calculated diaphragm thickness of 0.08". This gauge was located at the center of the plate. The 9/350 strain gauge had a gauge factor of 1.99, a 0.4" required diameter diaphragm, and a calculated diaphragm thickness of 0.11". The gauges were located at the corners of the plate spaced 0.75" from the central x-axis and y-axis. The recess, diaphragm diameter, and thickness were machined using a CNC milling machine. These dimensions were machined very accurately with the highest allowable tolerance. The surface directly over the diaphragm was thoroughly sanded with a die grinder with a 150 grit attachment and cleaned to ensure a perfect bond between the strain gauge and the steel. The strain gauges were glued directly in the center of the diaphragm using Loctite 401 super glue. Four terminal pads were glued in the center of each edge of the steel plate. AWG 34 enamel coated wire was used to connect each strain gauge soldering pad to the terminal pad. The linear diaphragm full bridge circuit had to be closed outside the sample. All six wires for each strain gauge were then soldered to the strain gauge and a terminal pad. A 0.04" thick ribbon cable with eight wires was soldered to the terminal pads and brought out of the sample. Armstrong A-12 Epoxy was used to bond the sample together. The sample was placed in a hot press under 250 psi at 200° F. for two hours to cure the epoxy.

Example 18

This strain gauge sample used a 4"×4"×½" steel plate and a 3"×3"×¼" 15% glass PTFE sheet. The steel plate was recessed 3.05"×3.05"×1/16" in the center for the PTFE pad. The steel plate was sanded and cleaned before manufacturing. Four SGT-9/350-LD11 Omega precision strain gauges were used. The strain gauge had a gauge factor of 1.99, a 0.4" required diameter diaphragm, and a calculated diaphragm thickness of 0.0575". The gauges were placed at the corners of the plate 0.875" from the central x-axis and y-axis. Channels $\frac{1}{16}$" deep and $\frac{1}{2}$" wide were recessed on the left side of each edge directly in front of each of the strain gauges. The diaphragm diameter and thickness were machined using a CNC milling machine. These dimensions were machined very accurately with the highest allowable tolerance. The surface directly over the diaphragm was thoroughly sanded with a die grinder with a 150 grit attachment and cleaned to ensure a perfect bond between the strain gauge and the steel. The strain gauges were glued directly in the center of the diaphragm using Loctite 401 super glue. Four terminal pads were glued in each of the channels. The strain gauges had uncoated leads attached to each of the solder pads. Mylar tape was placed around the gauge to ensure the wires did not touch the steel plate. The linear diaphragm full bridge circuit had to be closed outside the sample. All six wire leads for each strain gauge were then soldered to the terminal pad. An AWG 26 Ethernet cable was soldered to the terminal pad and was brought through the channel and out of the sample. Mastic tape was placed over the channel to protect the terminal pad. Armstrong A-12 Epoxy was used to bond the sample together. The sample was placed in a larger 6"×6" spring manufacturing device and a pressure of 50 psi was applied. The sample was set aside to cure for 5 days.

Large Scale Test Samples

Force Sensing Resistor

Example 19

This large scale Flexiforce sample used a 14"×14" steel base plate and a 12"×12"×¼" virgin PTFE sheet. The steel plate was recessed 12"×12"×$\frac{1}{16}$" in the center. A channel $\frac{1}{16}$" deep was recessed at the front of the plate to facilitate wiring. On the right side, the channel ramped down to 0.5" deep and 0.4" wide. The channel exited the plate from the center of the right edge. The steel plate was sanded and cleaned before manufacturing. Eight 100 lb HT201 Flexiforce sensors were used. The sensors were located in a 3×3 grid off the center of the plate. The center to center spacing between the sensors was 4". There was no sensor in the front, middle of the grid. Four layers of mylar tape were placed around the sensors to ensure that the sensing area was the highest internal point that the PTFE would rest on. The sensors were fixed to the steel plate with a piece of mylar tape across the tail. The leads of the sensors were cut leaving a flat metal lead. Three Digi-key flat ribbon cables were placed inside the sample and ran to the recessed channel. Two terminal pads were glued to the front outer edges of the 3×3 sensor grid. AWG 36 PTFE coated wires were soldered to each of the flat metal leads of the sensors and were directed to the closest ribbon cable or terminal pad. After wiring was completed, spacers were placed throughout the sample to increase the height of low points so the PTFE surface would not be extremely wavy after manufacturing. Mastic tape was placed over the terminal pads and ribbon cable ends to ensure they would not be covered in epoxy. Armstrong A-12 epoxy was used to bond the sample together. The sample was placed in a Wabash Hot Press under a pressure of 50 psi at a temperature of 200° F. The sample was allowed to cure for 1 hour under heat and then was held under pressure for 1 hour as the sample cooled to prevent any thermal shock. After the epoxy cured, an Amphenol 25 pair wire was stripped and placed in the 0.5" deep, 0.4" wide channel. Sixteen wires were laid out on the recessed channel and were soldered to the terminal pads and ribbon cables.

Strain Gauge Diaphragm Pressure Transducer

Example 20

This large scale strain gauge diaphragm pressure transducer sample used a 14"×14" steel base plate and a 12"×12"×¼" virgin PTFE sheet. The steel plate was recessed 12"×12"×$\frac{1}{16}$" in the center. A channel $\frac{1}{16}$" deep was recessed at the front of the plate to facilitate wiring. On the right side, the channel ramped down to 0.5" deep, 0.4" wide and exited the plate from the center of the right edge. Nine EA-06-S050P-350 Vishay circular transducer-class strain gauges were used. The strain gauge had a gauge factor of 2.05 and required a minimum diaphragm diameter of 0.41". The thickness calculated to achieve optimal strain values was 0.0445". The sensors were located in a 3×3 grid off the center of the plate. The center to center spacing between the sensors was 4". The diaphragm diameter and thickness were machined using a CNC milling machine in the center of the plate. These dimensions were machined very accurately with the highest allowable tolerance. The surface directly over the diaphragm was thoroughly sanded with a die grinder with a 150 grit attachment and cleaned to ensure a perfect bond between the strain gauge and the steel. The strain gauges were glued directly in the center of the diaphragm using Loctite 401 super glue. The strain gauge had six soldering pads, three on each side, on the outer edge of the sensing area. For the circular gauges, this was done inside the sample by connecting pad 1 to pad 2 and pad 4 to pad 5. AWG 36 PTFE coated wire was used for the internal wiring of the strain gauges. The wires were soldered to the strain gauge pad and to a Digi-key flat ribbon cable that ran to the recessed channel. Each of the strain gauges were connected to their own ribbon cable with two excitation lead wires and two measurement lead wires. Mastic tape was placed over ribbon cable ends to ensure they would not be covered in epoxy. Armstrong A-12 epoxy was used to bond the sample together. The sample was placed in a Wabash Hot Press under 50 psi at 200° F. The sample was allowed to cure for 1 hour under heat and then was held under pressure for 1 hour as the sample cooled to prevent any thermal shock. After the epoxy cured, an Amphenol 25 pair wire was stripped and placed in the 0.5" deep, 0.4" wide channel. Thirty-six wires were laid out on the recessed channel and were soldered to the terminal pads and ribbon cables.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense.

We claim:

1. A sliding bearing system, comprising:
   a metal base plate;
   one or more strain gauge pressure transducers, wherein each of the one or more strain gauge pressure transducers includes a top surface and a bottom surface, wherein a bottom surface of the metal base plate includes one or more diaphragms, and wherein the one or more strain gauge pressure transducers are attached to the metal base plate such that a given strain gauge pressure transducer of the one or more strain gauge pressure transducers is positioned over a top surface or a bottom surface of a given diaphragm of the one or more diaphragms; and
   a first sliding surface coupled to the metal base plate and further coupled to the one or more diaphragms, wherein the first sliding surface comprises a non-rigid material that is configured to under pressure loading to thereby deform the one or more diaphragms where the deformation of the one or more diaphragms are measured by the strain gauge pressure transducers.

2. The sliding bearing system of claim 1, further comprising a data transmission unit connected to the one or more strain gauge pressure transducers.

3. The sliding bearing system of claim 2, further comprising a processor configured to receive data from the data transmission unit.

4. The sliding bearing system of claim 2, wherein the data transmission unit comprises:
   a conducting wire coupled to each of the one or more strain gauge pressure transducers; and
   an external plug coupled to the conducting wire, wherein the external plug is positioned inside or outside of a perimeter of the metal base plate.

5. The sliding bearing system of claim 1, wherein the first sliding surface comprises polytetrafluoroethylene (PTFE).

6. The sliding bearing system of claim 1, wherein the sliding bearing system is coupled to one or more of an elastomeric bearing, a pot bearing, a disk bearing, a spherical bearing, or a pinned bearing.

7. The sliding bearing system of claim 1, wherein the metal base plate comprises steel.

8. The sliding bearing system of claim 1, wherein the metal base plate comprises aluminum.

9. The sliding bearing system of claim 1, wherein the top surface of the metal base plate includes a cutout, and wherein the one or more strain gauge pressure transducers are positioned in the cutout.

10. The sliding bearing system of claim 1, further comprising:
    a top plate; and
    a second sliding surface coupled to the top plate, wherein the second sliding surface is positioned in contact the first sliding surface.

11. The sliding bearing system of claim 10, wherein the first sliding surface comprises the same material as the second sliding surface.

12. The sliding bearing system of claim 10, wherein the first sliding surface comprises a different material than the second sliding surface.

13. The sliding bearing system of claim 1, wherein the metal base plate comprises a first material and the first sliding surface comprises a second material that is different than the first material.

14. A non-transitory computer readable medium having stored thereon instructions, that when executed by one or more processors, cause an additive manufacturing machine to create one or more components of the sliding bearing assembly of claim 1.

15. A method of vertical force measurement on bearings of construction, the method comprising:
    providing the sliding bearing system of claim 1 to a structural component;
    receiving a vertical force on the force sliding bearing system;
    measuring the vertical force by the one or more strain gauge pressure transducers to generate vertical force measurement data; and
    transmitting the vertical force measurement data to a processor configured to receive such data.

* * * * *